Dec. 9, 1924. 1,518,297
B. C. BARTON ET AL
VALVE FOR CONTROLLING THE ADMISSION OF HIGH AND LOW
PRESSURE LIQUID TO HYDRAULIC PRESSES
Filed Dec. 12, 1921 7 Sheets-Sheet 1
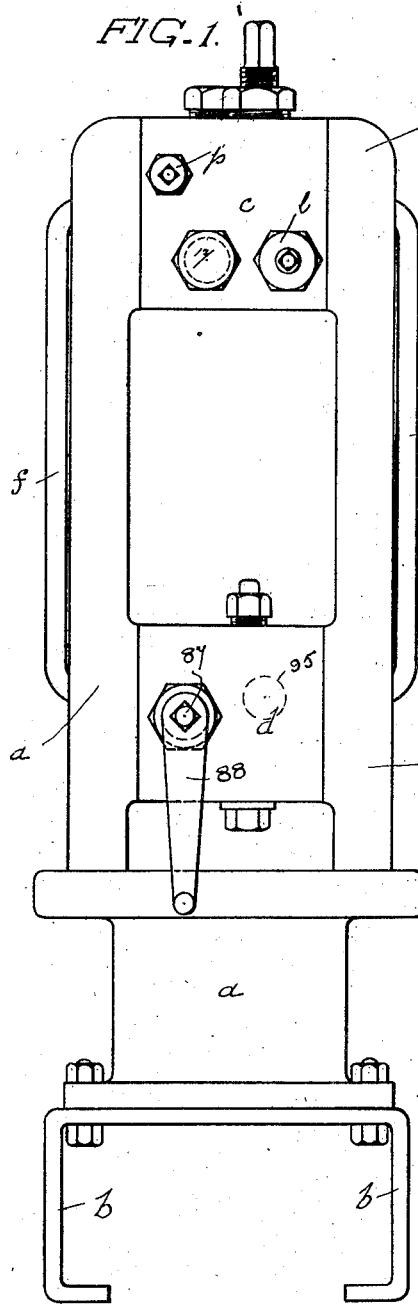
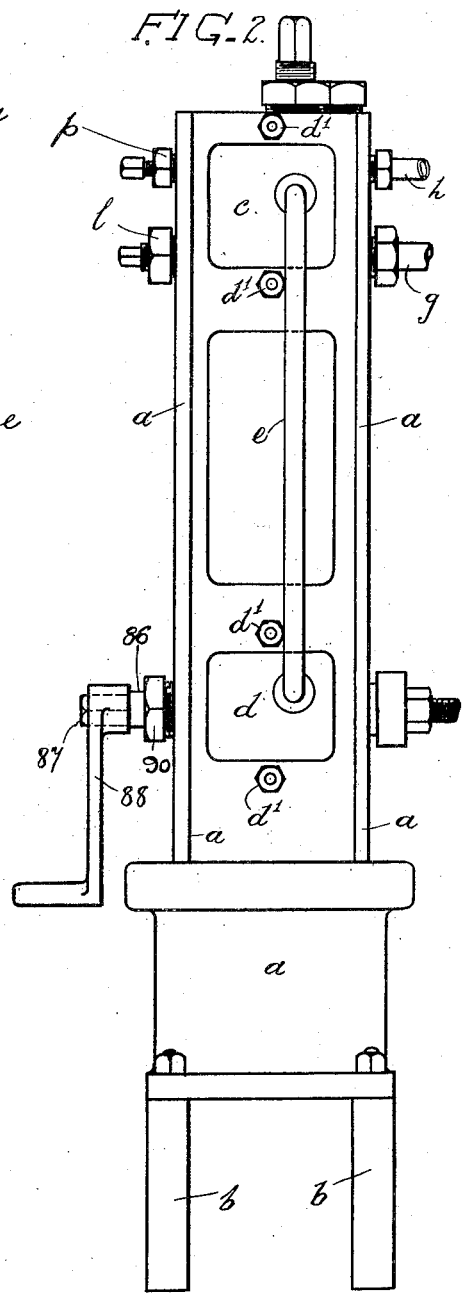

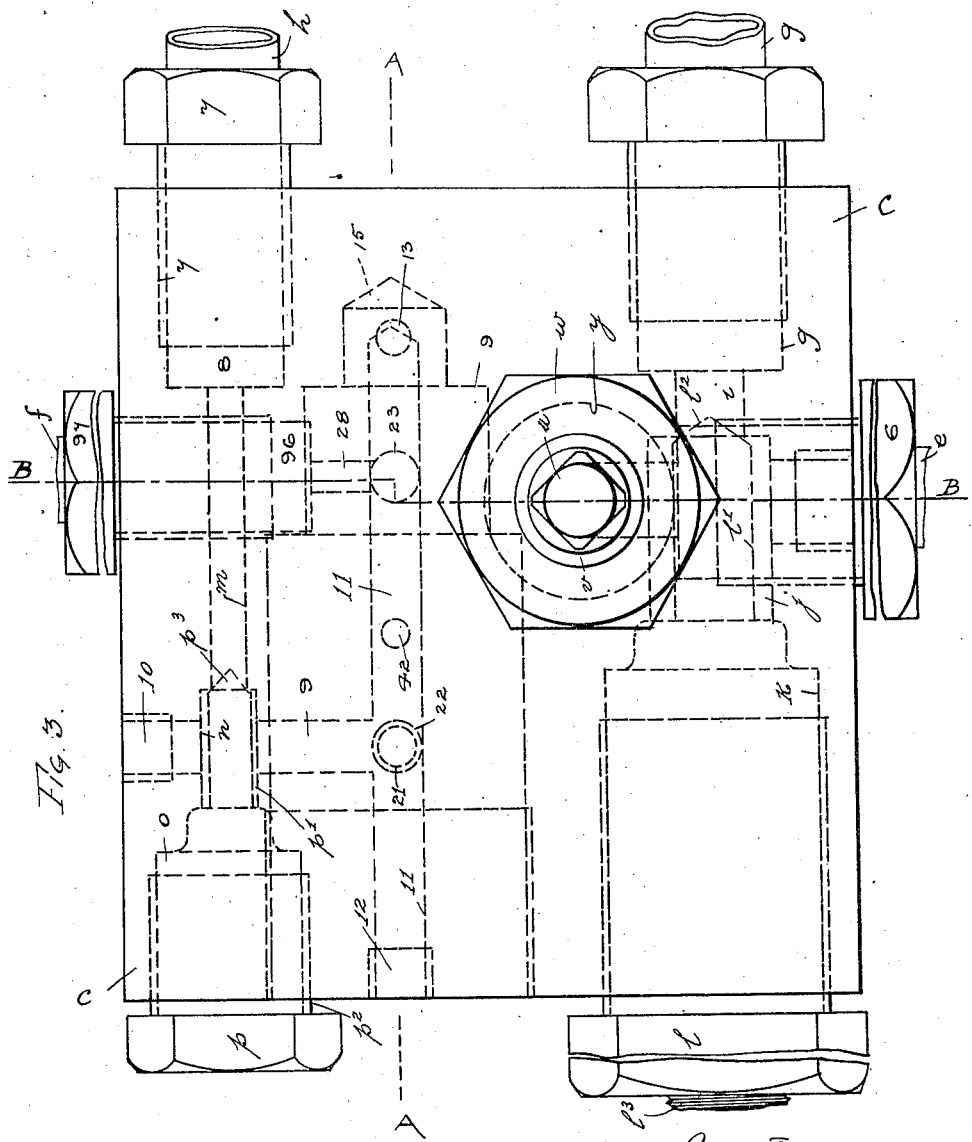

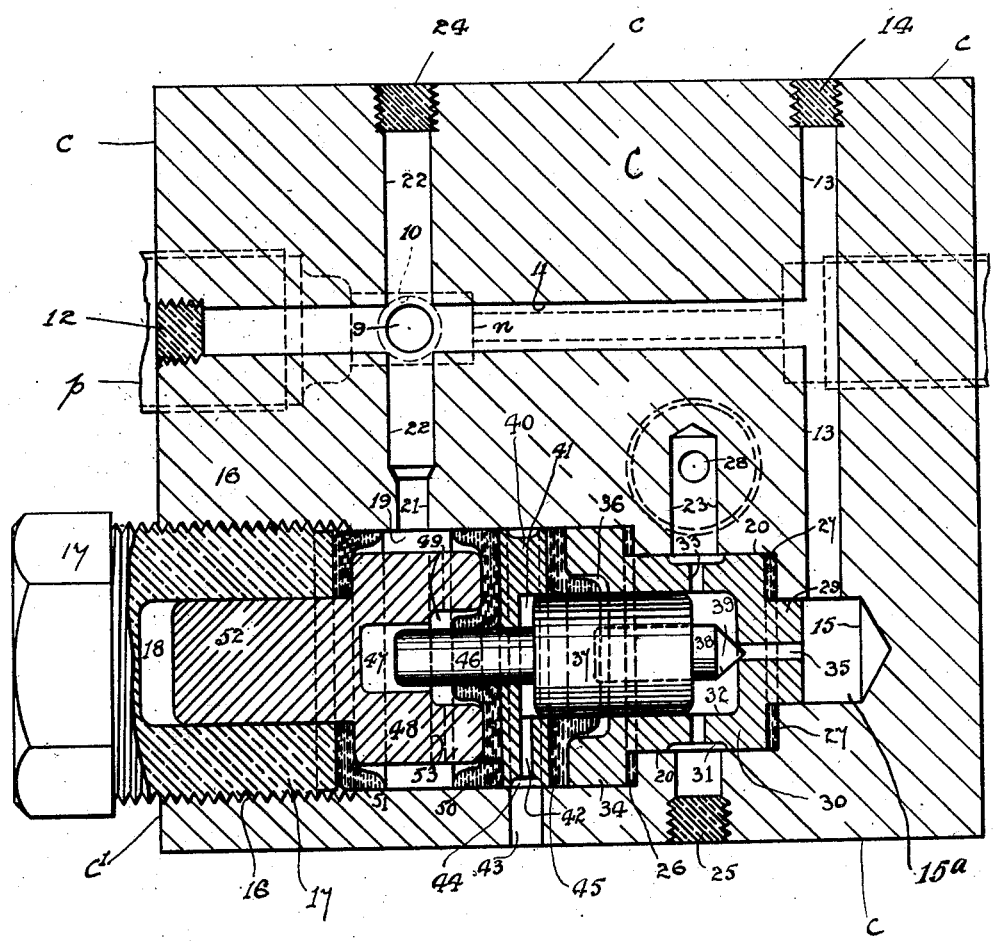

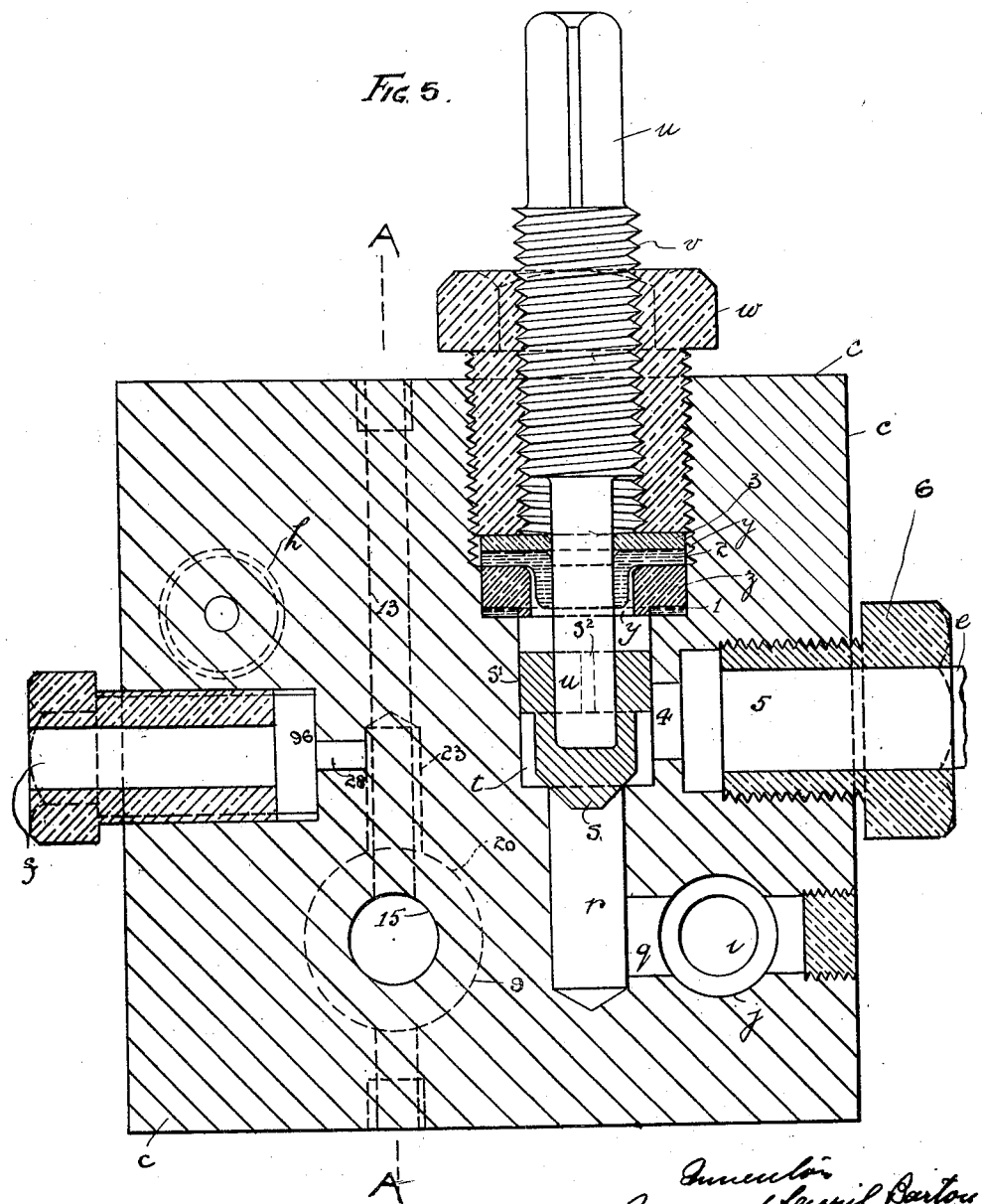

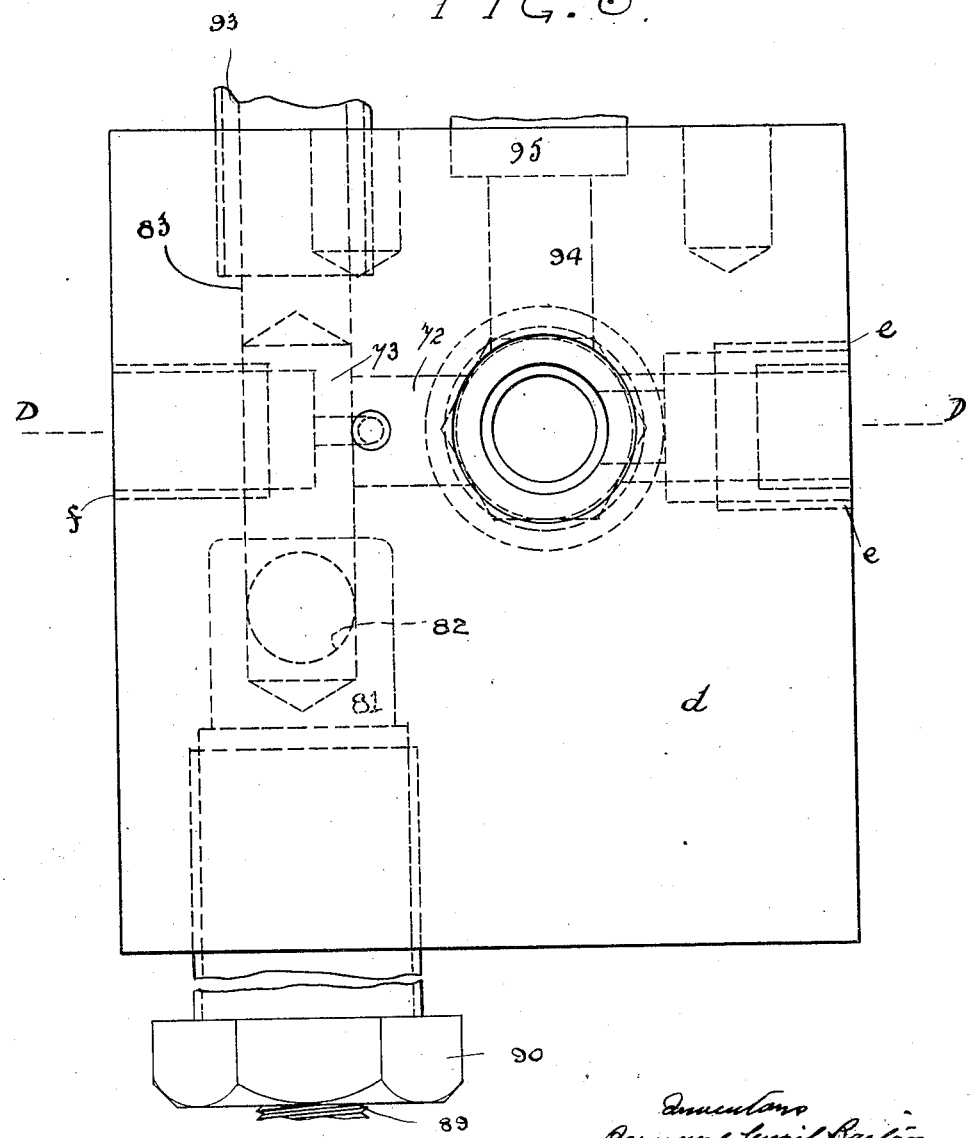

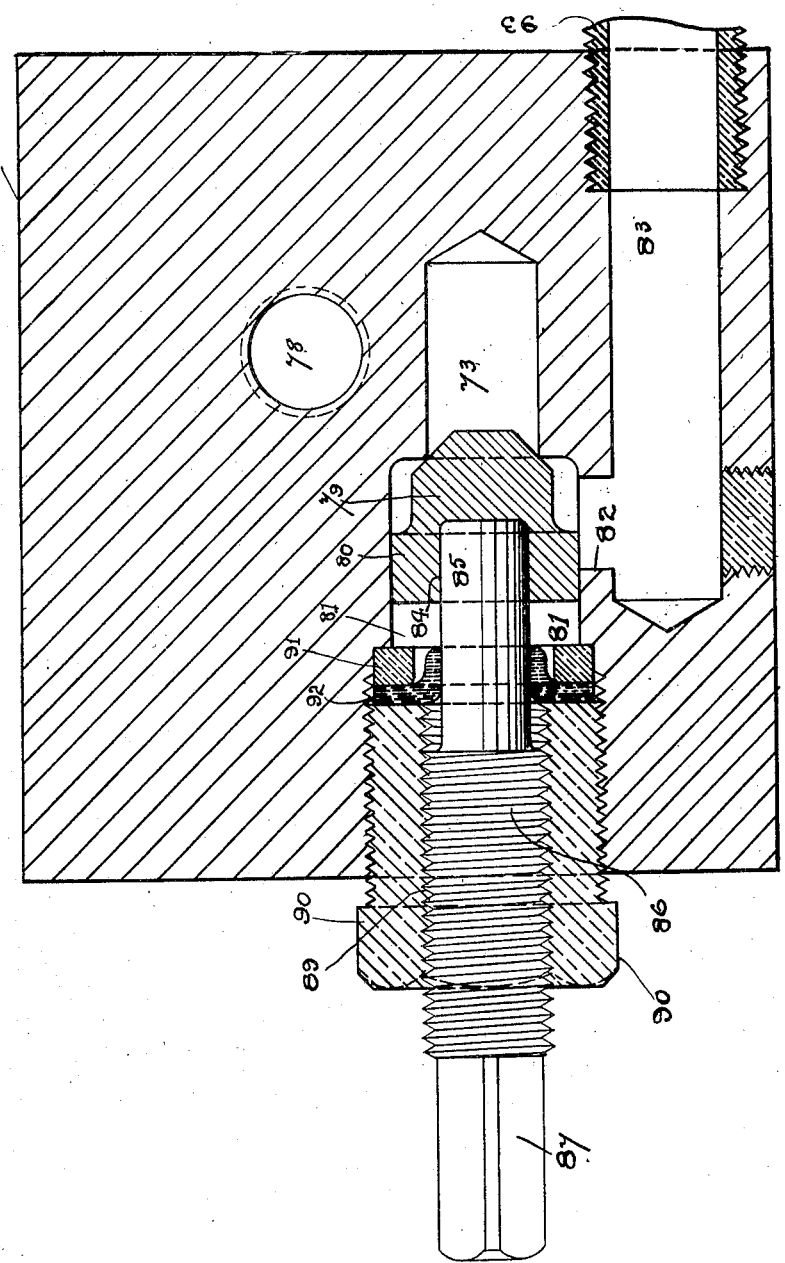

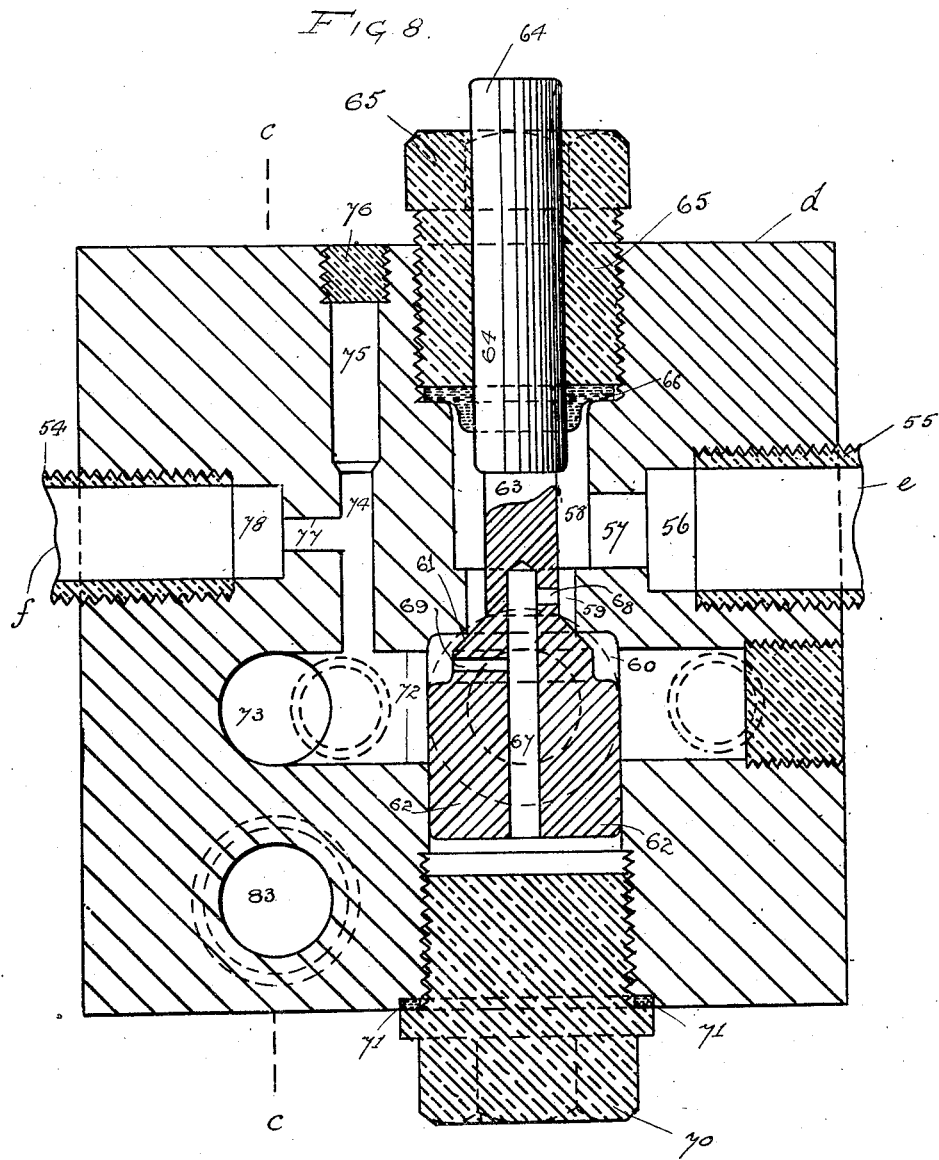

Patented Dec. 9, 1924.

1,518,297

UNITED STATES PATENT OFFICE.

BERNARD CYRIL BARTON, OF KINGSTON-UPON-HULL, AND RICHARD HASTE CARR, OF LEEDS, ENGLAND.

VALVE FOR CONTROLLING THE ADMISSION OF HIGH AND LOW PRESSURE LIQUID TO HYDRAULIC PRESSES.

Application filed December 12, 1921. Serial No. 521,862.

*To all whom it may concern:*

Be it known that we, BERNARD CYRIL BARTON, of Sun Chambers, Lowgate, in the city and county of Kingston-upon-Hull, England, and RICHARD HASTE CARR, of 5 Crown Point Road, Leeds, in the county of York, England, have invented new and useful Improvements in Valves for Controlling the Admission of High and Low Pressure Liquid to Hydraulic Presses, of which the following is a specification.

This invention relates to improvements in the arrangement of valves for the admission of high and low pressure liquids to hydraulic presses.

Hitherto in some arrangements of valves for hydraulic presses the high pressure valve has been retained in the closed position by means of a "constant" pressure from the low pressure accumulator acting upon an automatic ram arranged within the block or valve casing. In the said arrangement when the pressure in the press cylinder becomes equal to that of the low pressure accumulator the automatic ram is subject to an equal pressure at each end so that it allows the high pressure inlet valve to open.

This invention has particular reference to the automatic control of the high pressure inlet valve, and the automatic ram is acted upon at one end by the "constant" pressure from the high pressure accumulator while the other end of the said ram is in communication with the pressure in the press cylinder.

The object of this invention is to prevent the possibility of the high pressure inlet valve opening in the event of the low pressure failing from any cause. In order that the automatic ram may have the same pressure on both of its ends for allowing the high pressure inlet valve to open, the said ram, instead of being made of the same diameter throughout its length, is made of two diameters, that is to say, it is made at one end for a portion of its length of a small diameter, and the remaining portion of the ram is of a larger diameter, the two diameters bearing the same ratio one to the other as the high pressure and the low pressure. By this arrangement when the low pressure is attained in the cylinder it will balance the high pressure acting upon the smaller end of the automatic ram, the pressure in the press cylinder being in communication with the large end of the said ram.

A convenient method for carrying the invention into practice is illustrated in the accompanying drawings, in which—

Fig. 1 is a front elevation showing the general arrangement of the apparatus;

Fig. 2 is a side elevation of Fig. 1;

Fig. 3 a plan of the top block;

Fig. 4 a section on line A, A, Figs. 3 and 5;

Fig. 5 a section on line B, B, Fig. 3;

Fig. 6 a plan of the bottom block;

Fig. 7 a section of the bottom block on line C, C, Fig. 8;

Fig. 8 a section on line D, D, Fig. 6.

Figs. 3 to 8 are drawn to a larger scale than Figs. 1 and 2.

Like parts in all the views are marked with similar letters of reference.

$a, a$ is the framework of the apparatus which is made in a number of pieces and mounted upon a base $b, b$, said base being also made in one or more portions. $c$ the top block, and $d$ and bottom block bolted or otherwise secured at $d^1$ (Fig. 2) to the framework $a$. The blocks $c$ and $d$ are connected by the pipes $e$ and $f$ as hereinafter described.

The blocks $c, d$ are made of metal,—such as steel or wrought iron,—of any suitable size and shape. In each block are bored or otherwise formed a number of holes hereinafter termed "passages" which communicate with the inlets for low pressure and the high pressure, or with the pipes $e, f$, or passages formed in the said blocks, as will be presently described.

The inlet passages respectively for the low and high pressures are marked $g$ and $h$.

The following additional passages are also formed in the top block $c$, namely:—

The low pressure inlet is arranged to communicate with the reduced passage $i$ (Fig. 3) which forms a connection with an enlarged passage $j$ and with a passage $k$; the outer end of the last named passage is closed by a stop plug $l$. The communication between passages $i$ and $j$ is closed by the tapered end $l^2$ of the spindle $l^1$ which spindle is for rotative purposes. The passage $i$ which is in communication with passage *j* also in turn communicates with passages *q* and *r* (Fig. 5) for raising the valve *s*,—which also acts as a keep valve,— in the chamber *t* when it is desired to allow the low pressure to pass to its outlet and pipe *e*. To enable the low pressure fluid thus to pass to the said outlet and pipe the spindle *u*,—provided with a screw thread *v* and mounted in the plug *w*,—is raised. The plug *w* is arranged to be screwed into the recess or chamber *y* formed for its reception in the top block *c*. The valve *s* is formed in two diameters, the upper enlarged portion $s^1$ being arranged to fit and slide freely in the lower portion of the chamber *t*. The enlarged portion $s^1$ is provided with a grooved recess $s^2$. The lower and smaller portion of the valve,—which also slides in the chamber *t*,—is reduced in diameter to permit of the low pressure fluid passing through the passage *r* into the chamber *t* after raising the valve *s*, and to the outlet and pipe *e* through passage 4 and the hole 5 in plug 6. The lower end of the valve *s* is tapered,—as shown at Fig. 5,— to allow it to impinge against the orifice of the passage *r*. The said orifice forms the seating for the valve. In the upper parts of the valve is formed a recess for the reception of the lower and reduced end of the spindle *u*. The spindle *u* requires to be raised before the valve *s* can be opened by the low pressure fluid. *z* is a brass or other metal washer which is inserted in the recess *y* between the leather washers 1 and 2. A second metal washer is placed between the leather washer 2 and the inner end of the plug *w*.

The high pressure inlet *h* is connected to the block *c* by a coupling plug 7 which is screwed into a recess 8. The recess 8 communicates with a passage *m*,—reduced in diameter,—forming a connection with an enlarged supply passage *n* and with an enlarged passage or chamber *o* and which is closed at its outer end by a stop plug *p* screwed into the block *c*. On the reduced end $p^1$ of a screw threaded spindle $p^1$,—working in the plug *p*,—being opened the tapered end $p^3$ which forms a valve, is withdrawn from the orifice of the passage *m* whereby the high pressure fluid is allowed to pass into the passage 9, the outer end of which is closed by plug 10. From the passage 9 the high pressure fluid passes into the passage 11 and simultaneously into the passage 22. The outer end of the passage 11 is closed by a plug 12. The high pressure fluid after travelling along passage 11 enters the vertical passage 13 closed at its outer end by a plug 14. The horizontal passage 15 is shown to extend almost across the metal block *c* and it is made in length of more than one diameter for the purpose to be presently described. The passage 15 in its smallest diameter, that is, at the right hand side of Fig. 4, is larger in diameter than passage 13. The orifice of the horizontal passage 15 is made for a portion of its distance from the outside $c^1$ of the block *c* of the largest diameter and on its inner periphery is cut or otherwise formed a screw thread 16. Into the screw threaded portion 16 is inserted a screw threaded plug 17, the outer end of which is on the exterior of the block *c*, as shown.

In the inner end of the screw threaded boss 17 is formed a central recess 18 of suitable size and depth, say, of the same or larger diameter as the inner end of the passage 15.

The inner end of the plug 17 is reduced in diameter to the same size as the chamber 19. The passage 15 is again reduced in diameter at 20. That is to say, the passage 15 is made in its length of four different diameters, respectively marked $15^a$, 20, 19 and 16, the smallest diameter being, as previously explained, on the right hand side, or innermost portion of the hole 15, as shown at Fig. 4. The reduced portion 19, that is, the second of the four diameters counting from the orifice at $c^1$, forms a chamber for the reception of some of the hereinafter named parts. The reduced portion, which is hereinafter termed the chamber 19 is in communication with the reduced end 21 of the vertical high pressure passage 22. The passage 22 is in communication with the horizontal passages 9 and 11 and also with the high pressure vertical passage 13, which, at its lower end, is in communication with the smaller portion of the hole 15 which forms a chamber 15 for acting upon the parts hereinafter described. The horizontal passages 15 and 11 and vertical passages 22, 23 and 13 are formed by drilling holes from the exterior of the block *c*, and the said holes are respectively closed by the screw threaded bosses or plugs 10, 12, 14, 24 and 25.

The high pressure passage 9 is in communication with the horizontal passage 11 between the reduced and upper ends of the vertical passage 22.

The differences in the diameters of the chambers 19, 20 and 15 form shoulders 26 and 27 for the purposes to be presently described. The reduced portion or chamber 20 of the horizontal passage 15 at the upper portion of its periphery is in communication with a vertical passage 23 and the upper portion of the said passage at 28 communicates with the bottom block *d* by means of pipe *f*.

The smallest end of the passage 15 forms a high pressure chamber,—hereinafter termed the chamber 15,—and is in communication with the third vertical passage 13. In the second portion,—that is, the chamber 20,—is inserted a portion of a block 29 which is made of three diameters, the smallest diameter 29 fits into the chamber 15 with which the third vertical passage 13 communicates. The second diameter 30 of the block or seating fits the second portion or chamber 20 and in its periphery is formed an annular recess 31 with which the second vertical passage 23 communicates at its lower end. A communication between the annular recess 31 and the recess 32 is formed by the passages 33. The third diameter 34 of the said block or seating is of the same size as the third enlarged portion of the passage 15 which forms the chamber 19, from the inner end of the said horizontal passage 15. In the said block is formed a central recess 32, and in the end of the said block is formed a channel 35. The channel 35 communicates at its respective ends with the recess 32 and the high pressure chamber 15.

On the left hand side of the said block and in its largest diameter 34 is formed a recess 36 which is larger in diameter than the recess 32. In the recess 32 is mounted the automatic ram 37 provided with the detachable pin 38, of smaller diameter than the ram 37, which is pointed at 39 and forms a mitre valve for closing the passage 35 as and when required.

40 is a block provided with a recess 41 of the same diameter as the recess 32 and ram 37 which slides freely in the recesses 32 and 41. The recess 41 is provided with a passage 42 which in turn communicates with a passage 43 formed in the block c.

An annular recess 44 is formed in the block 40 so as to register with the passage 43. The recess 44 is of greater or about the same width as the diameter of the passage 43. The passages 42 and 43 are of different diameters and are provided for the passage of air or any liquid that may find its way into the recess 41 between the end of the automatic ram 37 and the bottom of the recess 41, thus avoiding any cushioning that might occur and prevent the free intermittent reciprocation of the said ram.

Between the enlarged portion 34 of the block 29 and the disc or block 40 is provided a leather washer 45, a portion of which enters the recess 36. The automatic ram 37 is provided with a stem 46 which enters the recess 47 of a block 48. A recess 49 is also formed in the front portion of the block 48. The main portion of the block 48 is smaller in diameter than the chamber 19 which communicates with the reduced portion 21 of the vertical high pressure passage 22.

In the chamber 19 between each of the vertical surfaces of the enlarged portion of block 48 are placed the leather washers 50 and 51 to form fluid-tight joints between the two surfaces of the block 48 and the inner end of the screw threaded boss or block 17. The reduced portion 52 of the block 48 enters into the recess 18 of the block 17. A communication is made between the chamber 19 and the recesses 47 and 49 by means of the passages 53.

It will readily be understood that the blocks 29 40 and 48 which are in circular or ring form and the stem 46 of the automatic ram 37 are made of metal. The stem 46 is arranged to slide freely within the recess 47 which is made larger than the diameter of the said stem 46 so as to permit of the high pressure fluid from the inlet 22 passing into a space between the recess 47 and the end of the stem 46.

The bottom block d, which is fixed in any convenient manner between the framework a, is connected to the top block c by means of pipes e and f and coupling plugs 54 and 55 screwed into the said block.

The low pressure fluid passes from the top block c down pipe e through coupling plug 55 into chamber 56, thence to passage 57, chamber 58, passage 59, and chamber 60. In the chamber 60 slides a reducing mitre valve 61 which is in one with the block 62. The reducing valve 61 is provided with a spindle made in two diameters marked 63 and 64. The enlarged portion slides in a central hole in the plug 65 which is screwed into the bottom block d. Between the inner end of the plug 65 and upper end of the passage 58 is inserted a leather washer 66 for making a fluid-tight joint. In the reducing valve is formed a central passage 67. Passages 68 and 69 respectively connect the central passage 67 with the passage 59 and chamber 60. The latter chamber is closed at its lower end by screw plug 70 which is made fluid-tight by washer 71. When the mitre valve 61 is closed against its seating, formed by the orifice at the lower end of passage 59, the low pressure fluid passes through passage 68 down passage 67 into chamber 60. When the last named chamber is filled the low pressure fluid commences to flow through passage 69 into passage 72 and to exhaust passage 73, which is closed by a valve as will be presently described. Simultaneously the low pressure fluid passes through passages 94 and 95 (Fig. 6) to the press cylinder, not shown in the drawings. The passages 94 and 95 are always in open communication with the low pressure and high pressure inlets by means of passages 68, 67 and 69. A reduced passage 74 with an enlarged portion 75 closed with a plug 76 is formed at right angles to the passage 73. From passage 74 the low pressure fluid passes into passages 77 which communicates with chamber 78 and is in turn connected with the pipe f by means of coupling 54. The low pressure fluid then passes to the top block and the high pressure automatic control valve 38 working therein as previously described.

At Figs. 6 and 7 the communications with the exhaust are shown, namely, when the fluid has passed from passage 72 into passage 73 it is prevented from passing to the chamber 81 and passages 82 and 83 by a mitre valve 79 which is formed in two diameters, the larger portion 80 being arranged to slide in the chamber 81. In the enlarged portion 80 is a central recess 84 for the reception of exhaust spindle 85 provided with an enlarged screw threaded portion 86, and a square end 87 for the reception of a hand lever 88 (Figs. 1 and 2). The enlarged screw threaded portion 86 is arranged to work in the internal screw-threaded portion 89 of the plug 90,—slightly larger in diameter than chamber 81,—which is screwed into the bottom block $d$. Between the inner end of the plug 90 and the shoulder formed by the differences in the diameter of chamber 81 and the recess into which the said plug is screwed is inserted a metal ring 91, and a leather packing 92 is inserted between the end of plug 90 and the ring 91. When the exhaust spindle 86 is unscrewed for withdrawing its end 85 the fluid in passage 73 can then open the mitre valve 79 and pass through passages 82 and 83, and exhaust pipe 93.

The action of the apparatus is as follows:—

When the apparatus is at work both the high pressure and the low pressure spindles $p^1$ and $l^1$ are always open by their tapered ends $p^3$, $l^2$, which form valves, being withdrawn from their seatings. The said spindles are only provided for closing purposes when any repairs are required to the internal parts of the top block $c$, or bottom block $d$.

The passages 94, 95 which are in communication with the press cylinder are always open.

Before commencing operations the low pressure mitre valve $s^1$ and the exhaust mitre valve 79 are closed.

When it is desired to raise the ram in the press cylinder, the spindle $u$ is unscrewed thereby allowing the low pressure fluid to raise the valve $s$. To do this the low pressure fluid enters by inlet $g$ and travels through passages $i$, $j$, and $q$ into passage $r$ when it lifts the valve $s$ and passes into chamber $t$ and thence through passages 4 and 5 to pipe $e$. A cushion is formed in the upper portion of chamber $t$ by the grooved recess $s^2$ allowing some of the low pressure fluid to pass above the upper surface of the valve. The low pressure fluid flows down pipe $e$ into the bottom block $d$. The low pressure fluid then flows through passages 56 and 57 to chamber 58 and passage 59 for opening the valve 61 when it passes through passages 68 and 67 into the lower portion of chamber 60 where a cushion is formed. The low pressure fluid opens the valve 61 which allows the fluid to flow freely into the passages 94 and 95 (Fig. 6) to the press cylinder. Simultaneously the said fluid flows into passages 72, 73, 74 and chamber 78 from thence into pipe $f$ to the top block $c$. When the reducing valve 61 is closed the low pressure fluid still continues to pass to the press cylinder and to the hereinbefore mentioned passages by means of passages 68, 67 and 69 which are formed in the spindle 63 and enlarged portion 62 of the reducing valve.

The several parts of the high pressure control apparatus, namely, the blocks 29, 40 and 48 and the automatic ram 37, mitre valve 39, having been assembled together with the washers 26, 27, 45, 51, and 50 in the position shown in the drawings are retained in their working position by the screw threaded block 17, the washers forming a liquid-tight joint in their several positions.

On high pressure liquid being admitted into the chamber 19 formed by reducing the periphery of the ring or block or seating 48 it will pass through the passages 53 therein into the central recess 49 of the said block or seating into the constant high pressure chamber formed by the space in the recess 47 beyond the end of the reduced portion or stem 46 of the automatic ram 37. The high pressure also simultaneously passes along the second horizontal passage 11 which communicates respectively at each of its ends with the vertical passages 13 and 22, and from thence enters the chamber 15. From the chamber 15 the high pressure liquid passes through the small hole or passage 35 which communicates with the internal recess or chamber 32 in the block or seating 30,—the passage 35 is closed by the mitre valve 39,—and will pass therefrom through passages 33 into the recess 31 and into the vertical passage 23 and through the passage 28 into chamber 96 (Fig. 3), coupling plug 97 and pipe $f$ through coupling 54, chamber 78, passages 77, 74, 72 and chamber 60; the latter communicates with the press cylinder.

When the pressure in the press cylinder attains what is termed "the low pressure", say, for example, half a ton,—more or less,—and the pressure in the constant high pressure chamber 47 at the inner end 52 of the block or seating 48 is, say, two tons, then it will balance the high pressure acting upon the stem or small end 39 of the automatic ram 37.

The high pressure entering the chamber 15 in connection with the vertical passage 13 will press back the mitre valve 39 until the ram 37 is balanced so as to permit of the high pressure passing from chamber 32 through passages 33 and recess 31 into the vertical passage 23 and from thence through passage 28 to the press cylinder.

When the high pressure fluid has passed through chamber 60 passages 59, 58 and 57 to chamber 56 the said fluid travels through coupling 55 and pipe $e$ to the coupling 6 of the top block $c$ thence through chamber 5, passage 4 to chamber $t$ where the valve $s$, which was formerly the low pressure valve, now acts as a keep valve for the low pressure fluid. The high pressure fluid then passes through groove $s^2$ in the enlarged portion $s^1$ of the valve $s$.

When the high pressure control opens the high pressure fluid then passes down pipe $f$ and into press cylinder, by the same way as which the low pressure fluid first entered, this is accomplished by reason of the high pressure fluid traveling into chamber 8, passages $m$, $n$, 9, 22, and reduced passage 21 (Fig. 3), chamber 19 (Fig. 4) and from there to passage 53 and chamber 47, where the high pressure fluid acts as a constant upon the rear portion 46 of the ram 37. Simultaneously with the high pressure fluid passing to chambers 19 and 47 it also passes through passages 11 and 13 to chamber 15 and through the small passage 35 where it acts upon the valve 39 in chamber 32 (Fig. 4).

When a predetermined pressure, that is one below the full low pressure, has been reached in the press cylinder the reducing valve 61 closes, but the low pressure fluid can still pass to the press cylinder through passages 68, 67, 69 and chamber 60. At this stage the low pressure in the press cylinder will be increased and when it attains a pressure say, of half a ton, in the press cylinder, the pressure in all of the passages is proportionately increased, the increase of pressure in chamber 32 acting on the larger surface of the ram 37 within the high pressure constant, will, in conjunction with the high pressure fluid entering through passage 35, move back the ram 37 and thus allow the valve 39 to be pressed from its seating, thereby permitting the high pressure fluid to pass through the passages 33 into the annular recess 31, up passage 23, along passage 28 (Fig. 4) to the chamber 96 (Fig. 5) and through pipe $f$ to the bottom block $d$. The high pressure fluid then passes through the passages that have been previously described for the low pressure fluid to the bottom block $d$ and into chamber 60, from where it is conducted to the press cylinder. Simultaneously the high pressure fluid passes through passages 69, 67 and 68 to passages 59, 58, 57 and 56 and up pipe $e$ to the top block $c$ and enters chamber 5, passage 4, chamber $t$, up groove $s^2$, which is formed in the upper portion of $s^1$ and is arranged to act upon the upper surface of the valve $s$ so as to prevent the entry of the low pressure. When the reducing valve 61 has been pushed open by the low pressure fluid it will automatically close long before the full low pressure has been attained in the press cylinder, but low pressure fluid will continue to enter the press cylinder by way of the by-passes 68, 67 and 69 formed in the reducing valve.

The object of the above action is to give a quick movement to the press ram, until it closes upon the material in the press, and then to continue the movement of the press ram very slowly until the resistance is sufficient to equal the full low pressure; then the high pressure fluid is admitted by way of the high pressure automatic control in the block $c$ and thus high pressure passes down pipe $f$ to the press cylinder, and it simultaneously passes up the pipe $e$ and closes the low pressure inlet valve $s$ which then acts as a keep valve as described. When the operation is complete low pressure spindle $u$ is shut down to retain the keep valve on its seat.

The exhaust valve spindle 87 can now be withdrawn thereby allowing the fluid to pass from the press cylinder and open valve 79 thereby forming a free passage to the exhaust passages 82, 83 and 93. Simultaneously the pressure is released on the large end of the automatic ram 37 of the high pressure control, and the high pressure constant closes the high pressure inlet 35 by means of mitre valve 39.

What we claim is:—

1. A valve construction for hydraulic presses and the like having in combination an upper block, a lower block, a plurality of passages in each of said blocks, means in the outer walls of said blocks for closing the latter, means separately admitting fluid of different pressures into the top block and conducting it to the bottom block, means in said top block for controlling the high pressure, and means in the bottom block for regulating the low pressure.

2. A valve construction for hydraulic presses and the like having in combination an upper block, a lower block, a plurality of passages in each of said blocks, means in the outer walls of said blocks for closing the latter, means separately admitting fluid of different pressures into the top block and conducting it to the bottom block, a valve in the top block for permitting the low pressure to be admitted to the lower block, and means conducting the high pressure from said lower block to the top block for normally maintaining said valve closed.

3. A valve construction for hydraulic presses and the like having in combination an upper block, a lower block, a plurality of passages in each of said blocks, means in the outer walls of said blocks for closing the latter, means separately admitting fluid of different pressures into the top block and conducting it to the bottom block, a stepped chambered recess in said top block, an automatic ram mounted in said recess, a valve in the top block for permitting the low pressure to be admitted to the lower block, and means conducting the high pressure from said lower block to the top block for normally maintaining said valve closed.

4. In an arrangement of valves for oil and other hydraulic presses in which two blocks and two pressures are used, a top block having a plurality of passages formed therein, screw-threaded plugs being inserted in some of the passages, two of the passages being respectively employed as inlets for the low and high pressures, and two of the passages being used for connecting the said block to a second one, and one of the passages being formed in its length of different diameters to form chambers, a plurality of rings and packings inserted in the said chamber, an automatic control ram working in one of the chambers provided with a mitre valve at one end and a stem at the other, a block having a recess in which the said stem slides, a valve working in a passage connected with one of the pipes, a screw-threaded spindle for keeping the valve on its seat, and a passage connected with the press ram, as set forth.

5. In an arrangement of valves for oil and other hydraulic presses in which two blocks and two pressures are used, a bottom block having a plurality of passages formed therein, pipes for connecting said block to the upper block, two of the passages being of varying diameters to form chambers, said passages being closed at one end with screw-threaded plugs, a spindle sliding in one of the said passages, said spindle having a reduced central portion to form a valve, an axial passage and two branch passages to form a by-pass for the lower pressure fluid to pass to the press when the said valve is closed upon its seating, an exhaust valve arranged in one of the passages, a screw-threaded spindle for keeping the exhaust valve upon its seating, a plug screwed in the bottom block, a ring and a packing inserted in the passage for making a fluid-tight joint, and coupling plugs for connecting the said pipes in a working position, as set forth.

6. A valve construction for hydraulic presses and the like having in combination an upper block, a lower block, a plurality of passages in each of said blocks, means in the walls of said blocks for closing said passages, a low pressure spindle in one of the passages of said upper block, a high pressure spindle in another passage of the upper block, a stepped chamber in the upper block having a ram mounted therein, said chamber communicating at different points with said passages, a closure for said chamber, means conducting the fluid from said high and low pressure spindles separately to the lower block and to the cylinder of the hydraulic press, a keep valve in said top block permitting the low pressure to be carried to the lower block, and means conducting the high pressure from the lower block to the top block for normally closing said keep valve.

BERNARD CYRIL BARTON.
RICHARD HASTE CARR.

Witnesses:
J. W. NORFOLK,
A. HEWITT.